United States Patent [19]

Claussen

[11] Patent Number: 5,326,519
[45] Date of Patent: Jul. 5, 1994

[54] PROCESS OF PREPARING ZIRCONIUM OXIDE-CONTAINING CERAMIC FORMED BODIES

[76] Inventor: Nils Claussen, Auf den Schwarzen Bergen 15, D-2107 Rosengarten, Fed. Rep. of Germany

[21] Appl. No.: 786,196

[22] Filed: Oct. 31, 1991

[30] Foreign Application Priority Data

Dec. 11, 1990 [DE] Fed. Rep. of Germany ....... 4039531
Aug. 31, 1991 [DE] Fed. Rep. of Germany ....... 4126738

[51] Int. Cl.$^5$ .............................................. C04B 35/48
[52] U.S. Cl. ....................................... 264/65; 264/66; 501/103; 501/104; 501/105
[58] Field of Search .................... 264/65, 66; 501/103, 501/104, 105

[56] References Cited

U.S. PATENT DOCUMENTS

| | | | |
|---|---|---|---|
| 2,741,822 | 4/1956 | Udy | 264/65 |
| 3,255,027 | 6/1966 | Talsma | 264/65 |
| 4,902,457 | 2/1990 | Wada | 264/80 |
| 5,024,795 | 6/1991 | Kennedy | 264/60 |

FOREIGN PATENT DOCUMENTS 0110712 6/1984 European Pat. Off. .
3812266C1 8/1989 Fed. Rep. of Germany .

OTHER PUBLICATIONS

WO-A-809 778, International Publication Date Dec. 15, 1988.

*Primary Examiner*—James Derrington
*Attorney, Agent, or Firm*—Nikaido, Marmelstein, Murray & Oram

[57] ABSTRACT

The present invention provides a zirconium oxide-containing ceramic formed body, wherein it is also free from amorphous phases on the grain boundaries and triple points, displays a shrinkage of less than 5% in comparison with its green body and is obtainable by reaction sintering of a green body, said ceramic formed body being formed from a mechanically alloyed mixture which contains or consists of at least 1% by volume zirconium metal powder and at least 20% by volume of one or more metallic powders selected from the elements magnesium, aluminum, copper, selenium, titanium, vanadium, chromium, manganese, iron, cobalt, nickel, zinc, strontium, yttrium, niobium, cerium, hafnium and tantalum, as well as the oxides thereof and zirconium oxide, sodium oxide, potassium oxide and lithium oxide.

The present invention also provides a process for the production of this ceramic formed body which can be used as a construction element in machines and apparatus, in electronics as a functional element and as a solid body electrolyte.

14 Claims, No Drawings

PROCESS OF PREPARING ZIRCONIUM OXIDE-CONTAINING CERAMIC FORMED BODIES

The present invention is concerned with a zirconium oxide-containing ceramic formed body and with a process for the production thereof.

Single and multiple phase formed bodies with ceramic matrix are increasingly used as temperature- and wear-resistant components in the construction of machines and apparatus. The production thereof is known via classical powder-metallurgical processes by means of pressing and sintering. These processes have the disadvantage of a high linear shrinkage of usually 15 to 25% which occurs between the green body and the end product. This impairs the maintenance of the shape and measurements and leads to crack formation and other faults which reduce the quality. This shrinkage is especially disadvantageous in the case of the incorporation of strengthening elements, such as fibres, platelets, whiskers or the like, on components not participating in the shrinkage since it acts disadvantageously on the consistency of the structure.

Admittedly, this disadvantage occurs scarcely or not at all in the case of reaction-bound ceramics (RBAO) but long reaction times are there necessary. There, too, a density of more than 90% of the theoretical density is only achieved with difficulty.

From Federal Republic of Germany Patent Specification DE 38 12 266 A1, it is already known metallurgically to produce a ceramic formed body based on aluminium oxide and/or aluminium nitride and/or aluminium oxynitride powder, whereby, in the said base phase, a disperse inorganic component is present embedded, which consists of powdered aluminium metal, which can contain alloying elements and, in the case of the sintering treatment, reacts to give aluminium oxide, nitride or aluminium oxynitride. The body obtained displays a clearly improved shrinkage behaviour, a low porosity and, in part, glass phase-free grain boundaries.

In a similar way, it is known from Federal Republic of Germany Patent Specifications Nos. DE 40 17 262 and DE 40 39 530 that a mullite ceramic body based on a mixture of aluminium powder and silicon-containing inorganic powders is obtained by reaction in an oxygen-containing atmosphere, which body shrinks only a little. However, in the case of Federal Republic of Germany Patent Specifications DE 38 12 226 and DE 40 39 530, the reaction times are very long, for example 8 hours at 1150° C. and subsequently a further 5 hours at 1500° C. This has the disadvantage that the process is energy-expensive and that correspondingly produced parts cannot be sintered together with other conventional ceramic green bodies. They must mostly first be reacted in a two-step process and subsequently sintered. Furthermore, the silicon-containing additions in Federal Republic of Germany Patent Specification DE 40 39 530 lead to amorphous intergranular phases which drastically impair the high temperature properties. In addition, the alloying additives required in Federal Republic of Germany Patent Specification DE 38 12 226 prevent the uniform oxidation of the aluminium particles so that cracks and comparatively large pores result which also reduce the strength.

Therefore, it is an object of the present invention to provide reaction-formed ceramic formed bodies which also have the above-mentioned advantageous properties, namely, low linear shrinkage between green body and end product and low porosity, as well as no glass phases. However, the most important object of the present invention is to provide a corresponding green body which, without an all too long holding time in the reaction step or even without any holding time, can be heated to the sinter temperature. A complete and uniform reaction is thereby to be ensured.

Thus, according to the present invention, there is provided a zirconium oxide-containing ceramic formed body, wherein it is also free from amorphous phases on the grain boundaries and triple points, displays a shrinkage of less than 8% in comparison with its green body and is obtainable by reaction sintering of a green body, said ceramic formed body being formed from a mechanically alloyed mixture which contains or consists of at least 1% by volume of zirconium metal powder and at least 20% by volume of one or more metallic powders selected from the elements magnesium, aluminium, copper, selenium, titanium, vanadium, chromium, manganese, iron, cobalt, nickel, zinc, strontium, yttrium, niobium, cerium, hafnium and tantalum, as well as the oxides thereof and zirconium oxide, sodium oxide, potassium oxide and lithium oxide.

The formed bodies according to the present invention have densities which, in general, exceed 90% of the theoretical density and preferably are from 92%. to 98% of the theoretical density. The zirconium oxide lies dispersed in the matrix wholly or preponderantly in the tetragonal modification which, inter alia, is also brought about by the stabilisation with yttrium trioxide, cerium dioxide or magnesium oxide, the average grain size being below 5 $\mu$m and preferably below 1 $\mu$m. In comparison with the green state, the volume change is generally $\pm 8\%$ and preferably $-3$ to $+1\%$. A glass phase is completely absent even on the grain boundaries and triple points since glass-forming substances, such as silicon and silicon dioxide, are not contained in the powdered starting material apart from unavoidable impurities present in traces. Furthermore, small amounts of alkali metal oxides can be present if special mineral compositions are desired, for example a side phase of $\beta$ or $\beta''$-aluminium oxide.

Precisely in the case of the aluminium oxide side phase, which preferably consists of the $\beta''$-crystal form, the zirconium/zirconium oxide addition has proved to be very advantageous for the formation of a fine, glass phase-free grain structure which makes this solid body electrolyte ceramic much firmer in comparison with conventionally produced $\beta/\beta''$-aluminium oxide.

As alloying elements, the ceramic formed body according to the present invention preferably contains additions of aluminium, yttrium, chromium, cerium, titanium, magnesium, niobium and tantalum, possibly together with alkali metals, whereby the latter can also be used in the form of their oxides or salts, for example carbonates.

The production of the formed body according to the present invention takes place by mixing zirconium metal with one or more of the elements magnesium, aluminium, copper, selenium, titanium, vanadium, chromium, manganese, iron, cobalt, nickel, zinc, strontium, yttrium, niobium, cerium, hafnium and tantalum in metal form and oxide form and/or with zirconium oxide, sodium oxide, potassium oxide and lithium oxide in such a manner that a finely-divided, mechanically alloyed powder mixture is obtained which is then pressed to give a green body which is sintered in an oxygen-containing atmosphere. If β/β''-aluminium oxide is to be produced, it is important that the mixture also contains sodium oxide and aluminium, as well as possibly also zirconium oxide. Furthermore, it is important that the aluminium powder is so intimately mixed with the zirconium or zirconium oxide powder that subsequently nanometer-sized particles of zirconium or zirconium oxide are distributed in the small aluminium particles or there is partly formed a dispersion of an intermetallic phase $Al_xZr_6$, preferably $Al_3Zr$, within the aluminium particles.

The composition of the powder mixture, which consists essentially of metal and metal oxide, can vary within wide limits. The proportion of metallic zirconium is generally from 1 to 50% by volume. When the proportion of zirconium metal exceeds 20%, zirconium oxide is preferably used in an amount which corresponds to the volume percentage of the zirconium metal ±25% by volume. The amount of oxides contained in the mixture is preferably from 20 to 65% by volume but, depending upon the desired properties and the period of sintering, these values can also be gone below or exceeded. The proportion of metal powder is from 20 to 80% by volume and is preferably from 30 to 75% by volume, the remainder consisting essentially of oxide.

The powdered starting materials are preferably mechanically alloyed in a ball mill in an organic liquid containing little free oxygen for at least 30 minutes. The mechanical alloying preferably takes place in the ball mill over a period of time of from 4 to 12 hours. As organic liquid, there can be used a lower alcohol, for example isopropanol or ethanol, a ketone, for example acetone, or a hydrocarbon and especially one with 5 to 8 carbon atoms. The average grain size of the ground powder is to be less than 5 μm and preferably less than 1 μm.

As ball mill, it is preferred to use an attritor mill, a stirrer mill or a bead mill.

To the mechanically alloyed powder mixtures produced as described above can possibly also be added particulate phases which improve certain properties, for example strength, preferably aluminium oxide, aluminium nitride, silicon carbide, titanium carbide, niobium carbide, tantalum carbide, titanium boride and/or boron carbide. This particulate phase is preferably in the form of fibres or platelets but other configurations can also be used when particular actions are aimed for therewith.

From the powdered, alloyed mixture produced in the above-described manner is then formed the desired green body with the use of powder metallurgical methods. Since the shrinkage is small, the green body can already be brought to the precise form of the desired ceramic body since due to the slight change of volume tending towards zero in the case of the reaction sintering, only a little or even no after-working is any longer necessary. As powder metallurgical forming methods, there can be used single-axis pressing, isostatic pressing, slip casting, tape casting or injection moulding. In the case of isostatic pressing, pressures of from 100 to 1000 MPa are especially preferred.

The reaction sintering of the so obtained green body can be carried out in one or several steps in the oxygen-containing atmosphere. As a result of the addition of at least 1% by volume of zirconium, the process is preferably carried out in one step since, because of the catalytic action of the zirconium, a very rapid oxidation of the aluminium takes place. An exception is β/β''-aluminium oxide in which, in the reaction step, the reaction between aluminium oxide and sodium oxide must first take place. However, this reaction is also favourably influenced by zirconium. In the heating-up phase, essentially between 200 and 800° C., the metallic components of the green body react partly with the oxygen of the atmosphere and partly with the oxides contained in the mixture itself, with an increase of the volume which compensates for the shrinkage in the case of the sintering and thereby results in a high density and low porosity.

According to a first embodiment of the process according to the present invention, the green body is heated up in an oxygen-containing atmosphere with a regulated rate of heating up, which is preferably 1 to 10 K/minute, to an end temperature of 1300 to 1650° C. and then maintained at this temperature until the oxidation reaction has proceeded to completion.

According to a second embodiment of the process according to the invention, the green body is, for the production of β/β''-aluminium oxide, heated in a first reaction step, again with a regulated rate of heating up, to a temperature of 900 to 1250° C., maintained or 0.5 to 4 hours at this temperature and thereafter, in a second step, heated to a sinter temperature of 1300 to 1650° C. and there again maintained at this temperature for 0.5 to 4 hours until the ending of the reaction and of the sintering procedure.

During the sintering step, the atmosphere can be moved or left stationary. In general, a moving atmosphere leads to a shortening of the period of heating. As atmosphere, there can be used, for example, pure oxygen, oxygen-nitrogen mixtures, such as normal air, oxygen-noble gas mixtures, especially with helium and argon, as well as such atmospheres with a certain addition of sodium oxide when aluminium oxide is to be produced. The oxygen-containing atmosphere may contain water vapor and/or may consist of pure oxygen, an oxygen/argon mixture or an oxygen/helium mixture.

The ceramic formed bodies according to the present invention are especially suitable as constructional elements in machines and apparatus and as functional elements in electronics, as well as solid electrolytes.

The following Examples are given for the purpose of illustrating the present invention:

EXAMPLE 1

150 g of a powder of 50% by volume aluminium (Alcan 105, 20 to 50 μm, Alcan, Montreal, Canada), 20% by volume zirconium (No. 00847, Alfa Prod., 1 to 3 pm), 2% by volume yttrium oxide (No. 87829, Alfa Prod.), 18% by volume zirconium oxide (TZ-2Y Co., Tosoh, Japan, less than 1 μm diameter) were ground for 8 hours in an attritor mill with 3 mm TZP x balls in acetone, the average powder particle size thereby being reduced to less than 1 μm. The mixture of the alloyed components was then mixed with 10% by volume of aluminium oxide platelets (Dycron 13, Hüls AG), dried in a rotary drier and subsequently pressed isostatically to plates with the dimensions 40×40×8 mm at a pressure of 500 MPa with the formation of a green body with a green strength of 27 MPa. Subsequently, the samples were heated in air at 1 K/minute to 1550° C. and maintained for 2 hours at this calcining stage in stationary air. Thereafter, the reaction sintering was concluded. The body obtained had extended by 1% in comparison with the green state. Density: 92% of the theoretical density; structure: α-aluminium oxide and tetragonal zirconium oxide; average grain size: less than 1 μm.

EXAMPLE 2

150 g of a powder mixture of 45% by volume aluminium (as in Example 1), 10% by volume chromium (Ventron Chemie), 5% by volume zirconium (as in Example 1) and 40% by volume aluminium oxide (CT 3000; Alcoa, U.S.A.) were, as described in Example 1, attrited and the powder obtained isostatically pressed with a pressure of 700 MPa to give a green body. The green body obtained had a green strength of 35 MPa. Subsequently, a one-step reaction sinter treatment was carried out as in Example 1. There was obtained a reddish coloured ceramic body which had tetragonal zirconium oxide incorporations. The shrinkage was 2.5% in the case of a density of 94% of the theoretical density.

EXAMPLE 3

150 g of a powder mixture of 30% by volume aluminium (as in Example 1), 20% by volume chromium (Ventron Chemie), 20% by volume zirconium (as in Example 1), 25% by volume zirconium oxide and 5% by volume cerium oxide (Alfa Prod.) were mechanically alloyed in an attritor in isopropanol for 8 hours in the manner described in Example 1 and subsequently isostatically pressed at 500 MPa to give green bodies. The samples obtained were heated up at 2 K/minute to 1600° C. and maintained at this temperature for 1 hour until the reaction sintering was concluded. The finished sample had a shrinkage of about 1% and had a density of 94% of the theoretical density in the case of closed porosity. Radioscopically there was found $\alpha$-(Al, Cr)$_2$O$_3$ with a small proportion of free chromium trioxide and tetragonal zirconium oxide.

EXAMPLE 4

150 g of a powder mixture of 50% by volume zirconium oxide (as in Example 1), 45% by volume zirconium (as in Example 1) and 5% by volume yttrium oxide were mechanically alloyed as described in Example 3, dried and formed by isostatic pressing at 100, 500 and 900 MPa to give rod-shaped sample bodies (5×5×40 mm). The green strength of the green bodies pressed at 900 MPa was 23 MPa. Subsequently, the sample bodies were heated up in one step at 5 K/minute to 1400° C. in stationary air and maintained for 3 hours at this temperature until the conclusion of the reaction sintering. Whereas the sample pressed with 100 MPa broke down into a powder, from the other two sample bodies there resulted firm ceramic bodies with a shrinkage of 4.5% and 2.3%, respectively, and densities of more than 97% of the theoretical density. The fine grained samples (less than 1 μm) consisted preponderantly of tetragonal zirconium oxide with small proportions of the cubic and monoclinic modification.

EXAMPLE 5

150 g of the powder mixture of 50% by weight lead titanium trioxide (PbTiO$_3$) (Alfa Prod.), 35% by weight zirconium (as in Example 1), 5% by weight titanium dioxide (Alfa Prod.) and 10% by weight lanthanum oxide (Alfa Prod.) were attrited as described in Example 3, dried and isostatically pressed at 500 MPa to give green bodies. Thereafter, the samples were reaction sintered in a first step at 1050° C. for 2 hours and thereafter in a second step at 1400° C. for 2 hours. The body obtained no longer showed any open porosity and consisted preponderantly of the perovskite structure of PLTZ with dispersed tetragonal zirconium oxide.

EXAMPLE 6

The mechanically alloyed powder according to Example 4 was admixed with 10% by volume aluminium oxide platelets (Atochem, Paris, about 10 μm diameter, 1 μm thickness). For this purpose, after the 8 hour attrition without platelets (at 700 r.p.m. in a 750 cc laboratory attritor), homogenisation was carried out for 15 minutes with the platelets at 300 r.p.m. After drying, isostatic pressing was carried out at 900 MPa and the green body obtained reaction sintered in the manner described in Example 4. The ceramic samples obtained showed no shrinkage and no open porosity.

EXAMPLE 7

150 g of a powder mixture of 8% by weight sodium carbonate (powdered, Merck AG), 55% by weight aluminium oxide (Ceralox MPA), 25% by weight aluminium (as in Example 1), 10% by weight zirconium (as in Example 1), 1.5% by weight magnesium oxide (Alfa Prod.) and 0.5% by weight lithium oxide (Alfa Prod.) were ground for 4 hours in an attritor in isopropanol. The liquid mixture (proportion of solids about 60%) was subsequently poured into a gypsum mould so that plate shaped samples were obtained with the dimensions 20×20×3 mm. The dried platelets were then heated up in a covered aluminium oxide crucible in a powdered bed of sodium carbonate first at 1 K/minute to 1200° C. and maintained at this temperature for 1 hour and subsequently heated up to 1600° C. at 10 K/minute and again maintained at this temperature for 1 hour. After cooling the oven, the sample consisted preponderantly of $\beta''$-aluminium oxide (=Na$_2$O.5 Al$_2$O$_3$) and zirconium oxide and, in the case of a shrinkage of 2%, had a density of 96% of the theoretical density. The 3-point bending strength of rodlets with the dimensions of 28×2×2 mm was 320 MPa.

EXAMPLE 8

Samples according to Example 6 were post-consolidated at 1600° C. for 10 minutes in a hot isostatic press at an argon pressure of 200 MPa. The almost 100% solid samples showed a 4-point bending strength of 1680 MPa.

EXAMPLE 9

150 g of a powder mixture of 9% by weight sodium carbonate (as in Example 7), 54% by weight aluminium oxide (as in Example 7), 25% by weight aluminium (as in Example 7), 9% by weight zirconium oxide (TZ-2Y, Tosoh, see Example 1), 1% by weight zirconium, 1.5% by weight magnesium oxide and 0.5% by weight lithium oxide were ground for 4 hours in a zirconium oxide-coated attritor with zirconium oxide grinding balls and zirconium oxide grinding discs in ethanol. In one variant, 9% by weight sodium carbonate was replaced by 9% by weight of a mixture of sodium carbonate and potassium carbonate (Alfa Prod.) in a mole ratio of 0.7:0.3.

The slip was subsequently dried in a rotary evaporator. Thereafter, the powders were pressed to give plates with the dimensions 40×40×8 mm (as in Example 1) with an isostatic pressure of 300 MPa. The green samples were thereupon heated up in a covered aluminium oxide crucible which contained 5 g sodium carbonate powder, first at 1K/minute to 1200° C. and maintained at this temperature for 2 hours and subsequently heated up at 5 K/minute to 1600° C. and maintained at this temperature for 1 hour.

After cooling the oven, both variants consisted preponderantly (>60%) of aluminium oxide with incorporated, preponderantly (>80%) tetragonal zirconium oxide particles. The shrinkage was 3.1% in the case of a density of 95% of the theoretical density. The 3-point bending strength of rodlets with the dimensions 28×2×2 mm was 290 MPa. The potassium oxide-containing variant had a density of 96% in the case of a shrinkage of 3.6% and a strength of 315 MPa.

I claim:

1. Process for the production of a zirconium oxide-containing ceramic formed body, said body being free from amorphous phases on the grain boundaries and triple points and displaying a shrinkage of less than 8% in comparison with its green body comprising producing a finely-divided, mechanically alloyed powder mixture of at least 1% by volume zirconium metal powder and at least 20% by volume of one or more metallic powder selected from the group consisting of the elements magnesium, aluminum, copper, selenium, titanium, vanadium, chromium, manganese, iron, cobalt, nickel, zinc, strontium, yttrium, biobium, cerium, hafnium and tantalum, as well as the oxides thereof and zirconium oxide, sodium oxide, potassium oxide and lithium oxide, pressing said mixture to give a green body and sintering said green body in an oxygen-containing atmosphere.

2. Process according to claim 1, wherein the powdered starting materials are mechanically alloyed for at least 30 minutes in a ball mill in an organic liquid containing little free oxygen.

3. Process according to claim 1, wherein the powdered starting materials are mechanically alloyed for at least 30 minutes in an attritor mill, a stirrer mill or a bead mill.

4. Process according to claim 2 or 3 wherein the organic liquid is acetone, ethanol, isopropanol or n-hexane.

5. Process according to claim 1, wherein, for the production of $\beta/\beta''$-aluminum oxide, said mechanically alloyed powder mixture comprises 1 to 5% by volume zirconium, 0 to 10% by volume zirconium oxide, 30 to 50% by volume aluminum oxide, 20 to 30% by volume aluminum, 15 to 30% by volume sodium carbonate or sodium oxide, 0 to 5% by volume yttrium oxide, 0 to 2% by volume magnesium oxide and 0 to 2% by volume lithium oxide.

6. Process according to claims 1, further comprising admixing a particulate-forming phase comprising at least one material selected from the group consisting of aluminum oxide, aluminum nitride, silicon carbide, titanium carbide, niobium carbide, tantalum carbide, titanium bromide and boron carbide with the mechanically alloyed powder.

7. Process according to claim 6, wherein the particulate-forming phase is in the form of fibres or platelets.

8. Process according to any of claim 1, wherein the green body is formed from the powdered alloyed mixture powder-metallurgically and thereafter worked up in a green state to the final dimensions.

9. Process according to claim 9, wherein the powder-metallurgical forming is carried out by form pressing, isostatic pressing, slip casting, tape casting or injection moulding.

10. Process according to claim 1, wherein the reaction sintering of the green body is carried out in one or more steps.

11. Process according to claim 10, wherein the green body is heated up in an oxygen-containing atmosphere in one reaction step with a heating-up rate of 1 to 10 K/minute to an end temperature of 1300 to 1650° C.

12. Process according to claim 10, wherein, for the production of $\beta/\beta''$-aluminium oxide, the green body is heated up in a first reaction step in a sodium oxide-containing atmosphere to 900 to 1250° C. and maintained for 0.5 to 4 hours and thereafter is heated in a second step to a sinter temperature of 1300 to 1650° C.

13. Process according to any of claims 10 to 12, wherein the sintering is carried out in an oxygen-containing atmosphere which is moved and comprises pure oxygen, an oxygen/argon mixture or an oxygen/helium mixture.

14. Process according to claim 13, wherein said oxygen-containing atmosphere contains water vapour.

* * * * *